United States Patent [19]

Wein

[11] E Re. 29,486

[45] Reissued Dec. 6, 1977

[54] TIMEPIECE

[75] Inventor: Irving L. Wein, Chicago, Ill.

[73] Assignee: Clinton Watch Company, Chicago, Ill.

[21] Appl. No.: 528,212

[22] Filed: Nov. 29, 1974

Related U.S. Patent Documents

Reissue of:

[64] Patent No.: 3,760,585
Issued: Sept. 25, 1973
Appl. No.: 179,988
Filed: Sept. 13, 1971

[51] Int. Cl.[2] ..... G04B 39/00; G04B 19/06

[52] U.S. Cl. ..... 58/91; 58/127 R

[58] Field of Search ..... 58/4, 5, 127 R, 58, 58/91

[56] References Cited

U.S. PATENT DOCUMENTS 3,665,701 5/1972 Burdet ..... 58/91

FOREIGN PATENT DOCUMENTS 996,795 12/1951 France ..... 58/58
235,071 11/1944 Switzerland ..... 58/58

*Primary Examiner*—George H. Miller, Jr.
*Attorney, Agent, or Firm*—Wallenstein, Spangenberg, Hattis & Strampel

[57] ABSTRACT

A timepiece, comprising indicating means driven by a movement for indicating the hours and minutes and also the date, characterized in that there are disposed around the said indicating means a first annular surface carrying indications of the dates of a month of 31 days, and a second annular surface concentric with the first one and carrying indications of the consecutive days of the week of at least five consecutive weeks, at least one of said annular surfaces being disposed on a turning ring which can be rotated manually for radially aligning the indications of the dates and the indications of the days of the week to form a complete calendar of a month.

3 Claims, 2 Drawing Figures

TIMEPIECE

Matter enclosed in heavy brackets [ ] appears in the original patent but forms no part of this reissue specification; matter printed in italics indicates the additions made by reissue.

The present invention relates to a timepiece comprising means driven by a movement for indicating the hours and minutes and also the date, characterized in that there are disposed around the said means a first annular surface carrying indications of the dates in a month of 31 days, and a second annular surface, concentric with the first one and carrying indications of the consecutive days of the weeks of at least five consecutive weeks, at least one of said annular surfaces being disposed on a turning ring which can be rotated manually for radially aligning the indications of the dates and the indications of the days of the week to form a complete calendar of a month.

Embodiments of the timepiece according to the invention will be described hereinafter, by way of examples, with reference to the accompanying drawing in which.

Figure 1:
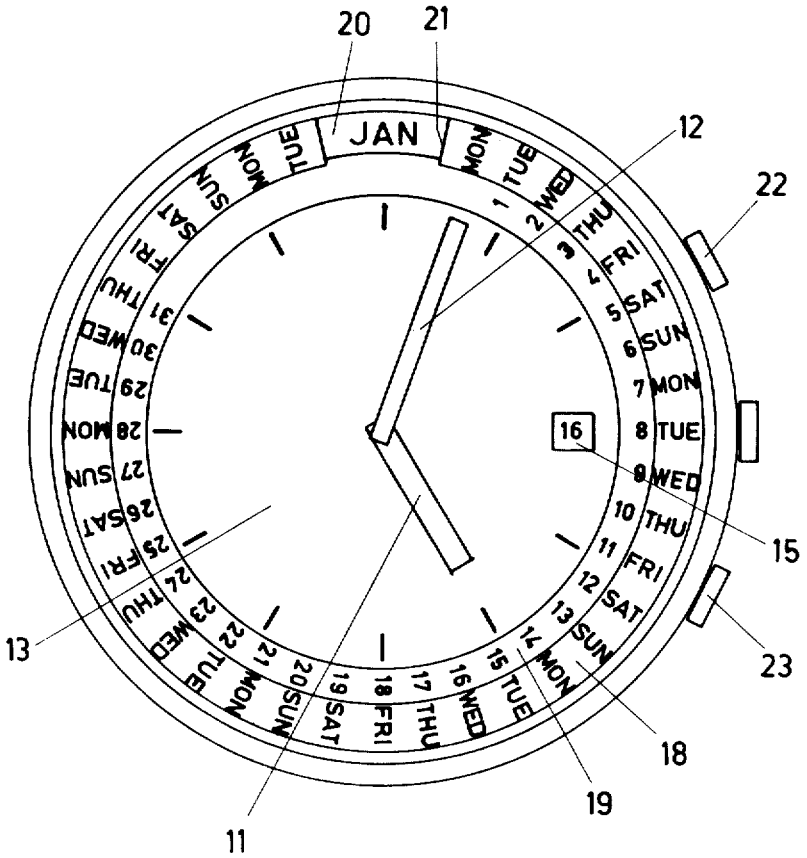
FIG. 1 is a plan view of a watch.

The watch shown in the drawing includes, in known manner, means for indicating the hours and the minutes in the form of hands 11 and 12. These hands, which cooperate with time markings on a dial 13, are driven by a conventional movement (not shown) housed in a compartment 14 of a watch casing, which movement also drives a date ring mounted below the dial. One of the date indications on this date ring is visible in a window 15 in the dial 13. The elements described hereinbefore are arranged in a housing comprising a case middle part 16 and a crystal 17.

In the case middle part are also mounted a stationary bezel 18, a first turning bezel 19 and a second turning bezel 20. The visible annular surface of the stationary bezel 18 carries 37 indications of consecutive days of the week. The first turning bezel 19 is arranged inside the stationary bezel 18 and has an annular surface which is concentric with the annular surface of the bezel 18 and carries indication of the dates of a month of 31 days. Each one of these date indications on the bezel 19 is in radial alignment with one of the indications of days of the week provided on the stationary bezel 18 so as to form a complete calendar of one month. Since different months do not begin with the same days of the week the bezel 19 can be turned manually at the end of every month for aligning the first day of the succeeding month with the correct day of the week. For this purpose it would be sufficient, in principle, if the bezel 18 carried, in an uninterrupted series, indications of the days of the week of five weeks. In the watch shown in the drawing the stationary bezel 18 is interrupted by a window 21, and therefore 37 indications of days of the week must be provided.

The second turning bezel 20 is mounted below the stationary bezel 18 and carries indications of the 12 months of the year. One of these indications is visible in the window 21 of the stationary bezel 18. At the end of every month the bezel 20 can be turned manually for making the indication of the next month appear in the window 21.

Figure 2:
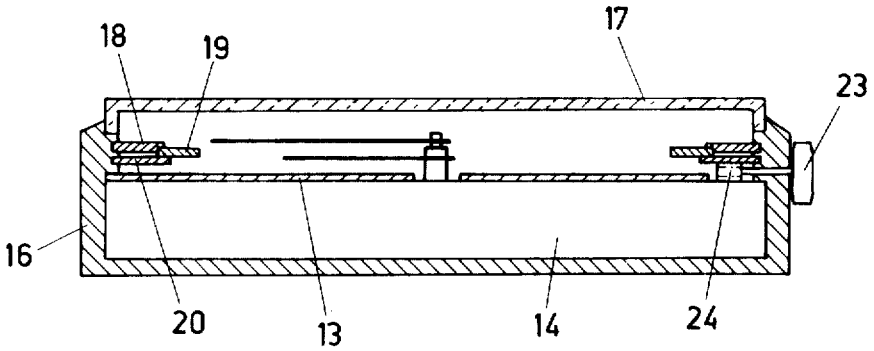
FIG. 2 is a diagrammatic sectional view of the watch.

As the turning bezels 19 and 20 are mounted inside the case middle part 16 and below the crystal 17, two crowns 22 and 23 carrying pinions are provided for rotating the bezels, the pinions being in engagement with teeth formed on the bottom surface of the bezels 19 and 20. Only the pinion 24 associated with the crown 23 is visible in the drawing in FIG. 2.

It is obvious that the bezel 19 carrying the date indications could be replaced by a turning bezel mounted on the outside of the case middle part 16, and outside the crystal, so as to be capable of being manually rotated directly by the fingers. The bezel 20 carrying the month indications could be omitted, and the indications of the days of the weeks could then be carried directly on an annular surface of the dial, instead of on a stationary bezel.

The indications of the dates and the indications of the days of the week could also be interchanged, i.e., one could dispose the date indications on a stationary annular surface and the day of the week indications on a turning bezel. The surfaces carrying the two kinds of indications could both be turning, but in any case it is necessary that they can also be rotated relatively to one another.

The watch described above shows, in addition to the time and the date, also a complete calendar of the instant month and an indication of the name of this month, requiring only a simple manual setting once in every month. If desired, one could also provide means driven by the movement for indicating in known manner the day of the week in the window 15 of the dial, but it will be appreciated that this is in general superfluous.

What is claimed is:

1. A timepiece, comprising indicating means driven by a movement, said indicating means including hands for indicating the hours and minutes and a date ring for indicating the date, characterized in that there are disposed around the said indicating means within the casing of the timepiece a first annular surface carrying indications of the dates of a month of 31 days, a second annular surface concentric with the first one and carrying indications of the consecutive days of the week of at least five consecutive weeks, at least one of said annular surfaces being stationary and having window formed therein, the other of said annular surfaces being disposed on a turning ring which can be rotated manually for radially aligning the indications of the dates and the indications of the days of the week, and a third annular surface carrying indications of the 12 months of the year, said third annular surface being disposed on a turning ring which can be manually rotated for presenting one of the twelve month indications in the window of said at least one stationary annular surface, said surfaces cooperating to form a complete calender of a month.

2. A timepiece according to claim 1, characterized in that the said turning rings are arranged inside the casing of the timepiece, and are provided with teeth, and in that a separate crown carrying a pinion in engagement with said teeth is provided for rotating each of the rings.

*3. In a watch which includes indicating mechanism driven by a watch movement and wherein said indicating mechanism indicates hours and minutes, said movement and said indicating mechanism being supported in a watch casing; the improvement which comprises a stationary bezel; a turning bezel arranged inside said stationary bezel; said stationary bezel having a visible annular surface carry-*

*ing indications of consecutive days of the week of at least five weeks; said turning bezel having a visible annular surface which is concentric with the annular surface of said stationary bezel, said turning bezel carrying numerals from 1 to 31 in consecutive order corresponding to the dates of a month having 31 days; each one of the date indications on the turning bezel being adapted to be placed in radial*

*alignment with a day of the week indication on the stationary bezel; said stationary bezel and said turning bezel being supported independently of the watch movement; and means externally of said casing to effect manual turning of said turning bezel.*

* * * * *